US006973207B1

(12) United States Patent
Akopyan et al.

(10) Patent No.: US 6,973,207 B1
(45) Date of Patent: Dec. 6, 2005

(54) METHOD AND APPARATUS FOR INSPECTING DISTORTED PATTERNS

(75) Inventors: Mikhail Akopyan, Natick, MA (US); Lowell Jacobson, Grafton, MA (US); Lei Wang, Shrewsbury, MA (US)

(73) Assignee: Cognex Technology and Investment Corporation, Mt. View, CA (US)

( * ) Notice: Subject to any disclaimer, the term of this patent is extended or adjusted under 35 U.S.C. 154(b) by 0 days.

(21) Appl. No.: 09/451,084

(22) Filed: Nov. 30, 1999

(51) Int. Cl.[7] .............................................. G06K 9/00

(52) U.S. Cl. ..................................... 382/143; 382/142

(58) Field of Search ................................ 382/151, 155, 382/159, 142, 143, 209, 287, 289, 300

(56) References Cited

U.S. PATENT DOCUMENTS 5,271,068 A * 12/1993 Ueda et al. ................. 382/216
5,465,152 A 11/1995 Bilodeau et al.
5,581,276 A * 12/1996 Cipolla et al. .............. 345/156
5,604,819 A * 2/1997 Barnard ...................... 382/151
5,627,915 A * 5/1997 Rosser et al. ............... 382/219
5,673,334 A * 9/1997 Nichani et al. ............... 348/95
5,699,443 A * 12/1997 Murata et al. ................ 348/44
5,777,729 A * 7/1998 Aiyer et al. ............. 356/237.1
5,825,483 A * 10/1998 Michael et al. .......... 356/237.1
6,009,213 A * 12/1999 Miyake ...................... 358/466
6,088,482 A * 7/2000 He et al. .................... 382/202
6,285,799 B1 * 9/2001 Dance et al. ............... 382/260
6,330,354 B1 * 12/2001 Companion et al. ........ 382/147
6,370,197 B1 * 4/2002 Clark et al. ............ 375/240.11

* cited by examiner

*Primary Examiner*—Vikkram Bali
(74) *Attorney, Agent, or Firm*—Russ Weinzimmer

(57) ABSTRACT

An embodiment of the invention provides a method for training a system to inspect a spatially distorted pattern. A digitized image of an object, including a region of interest, is received. The region of interest is further divided in to a plurality of sub-regions. A size of each of the sub-regions is small enough such that a conventional inspecting method can reliably inspect each of the sub-regions. A search tool and an inspecting tool are trained for a respective model for each of the sub-regions. A search tree is built for determining an order for inspecting the sub-regions. A coarse alignment tool is trained for the region of interest. Another embodiment of the invention provides a method for inspecting a spatially distorted pattern. A coarse alignment tool is run to approximately locate a pattern. Search tree information and an approximate location of a root image, found by the coarse alignment tool, is used to locate sub-regions sequentially in an order according to the search tree information. Each of the sub-regions is inspected, the sub regions being small enough such that a conventional inspecting method can reliably inspect each of the sub-regions.

36 Claims, 6 Drawing Sheets

METHOD AND APPARATUS FOR INSPECTING DISTORTED PATTERNS

RESERVATION OF COPYRIGHT

This patent document contains material subject to copyright protection. The copyright owner has no objection to the facsimile reproduction by anyone of the patent document, as it appears in the U.S. Patent and Trademark Office patent files or records, but otherwise reserves all copyright rights whatsoever.

BACKGROUND OF THE INVENTION

1. Field of the Invention

Aspects of the invention relate to certain machine vision systems. Other aspects of the invention relate to visually inspecting a nonlinearly spatially distorted pattern using machine vision techniques.

2. Description of Background Information

Machine vision systems are used to inspect numerous types of patterns on various objects. For example, golf ball manufacturers inspect the quality of printed graphical and alphanumerical patterns on golf balls. In other contexts, visual patterns of objects are inspected, including, e.g., printed matter on bottle labels, fixtured packaging, and even credit cards.

These systems generally perform inspection by obtaining a representation of an image (e.g., a digital image) and then processing that representation. Complications are encountered, however, when the representation does not accurately reflect the true shape of the patterns being inspected, i.e., the representation includes a nonlinearly spatially distorted image of the pattern.

A nonlinearly spatially distorted image comprises a spatially mapped pattern that cannot be described as an affine transform of an undistorted representation of the same pattern. Nonlinear spatial distortions can arise from the process of taking an image of the object (e.g., perspective distortions may be caused by changes in a camera viewing angle) or from distortions in the object itself (e.g., when a credit card is laminated, an image may stretch due to melting and expansion caused by heat during lamination).

Current machine vision methods encounter difficulties in inspecting patterns with nonlinear spatial distortions. For example, after a system has been trained on an image of a flat label, the system could not then be used to reliably inspect the same label wrapped around a curved surface, such as a bottle. Instead, the distorted pattern will cause the system to falsely reject a part because its image comprises a nonlinearly spatially distorted pattern.

SUMMARY OF THE INVENTION

An embodiment of the present invention provides a method for training a system to inspect a nonlinearly distorted pattern. A digitized image of an object, including a region of interest, is received. The region of interest is further divided into a plurality of sub-regions. A size of each of the sub-regions is small enough such that inspecting methods can reliably inspect each of the sub-regions. A search tool and an inspecting tool are trained for a respective model for each of the sub-regions. A search tree is built for determining an order for inspecting the sub-regions. A coarse alignment tool is trained for the region of interest.

A second embodiment of the invention provides a method for inspecting a spatially distorted pattern. A coarse alignment tool is run to approximately locate the pattern. Search tree information and the approximate location of a root sub-region found by the coarse alignment tool are used to locate a plurality of sub-regions, sequentially in an order according to the search tree information. Each of the sub-regions are small enough such that inspecting methods can reliably inspect each of the sub-regions. Each of the sub-regions is inspected.

BRIEF DESCRIPTION OF THE DRAWINGS

Illustrative embodiments of the invention are described with reference to the following drawings in which.

DETAILED DESCRIPTION

An embodiment of the invention addresses the problem of inspecting patterns having nonlinear spatial distortions by partitioning an inspection region into an array of smaller sub-regions and applying image analysis techniques over each of the sub-regions. Because the image is broken down into smaller sub-regions, those image analysis techniques need not be complex or uniquely developed (e.g., existing simple and known techniques can be used such as golden template comparison and correlation search). The illustrated system works well in situations in which there are no discontinuities in a two-dimensional spatial distortion field. An independent affine approximation is used to model the distortion field over each local sub-region. This results in a "piece-wise linear" fit to the distortion field over the full inspection region.

Figure 1:
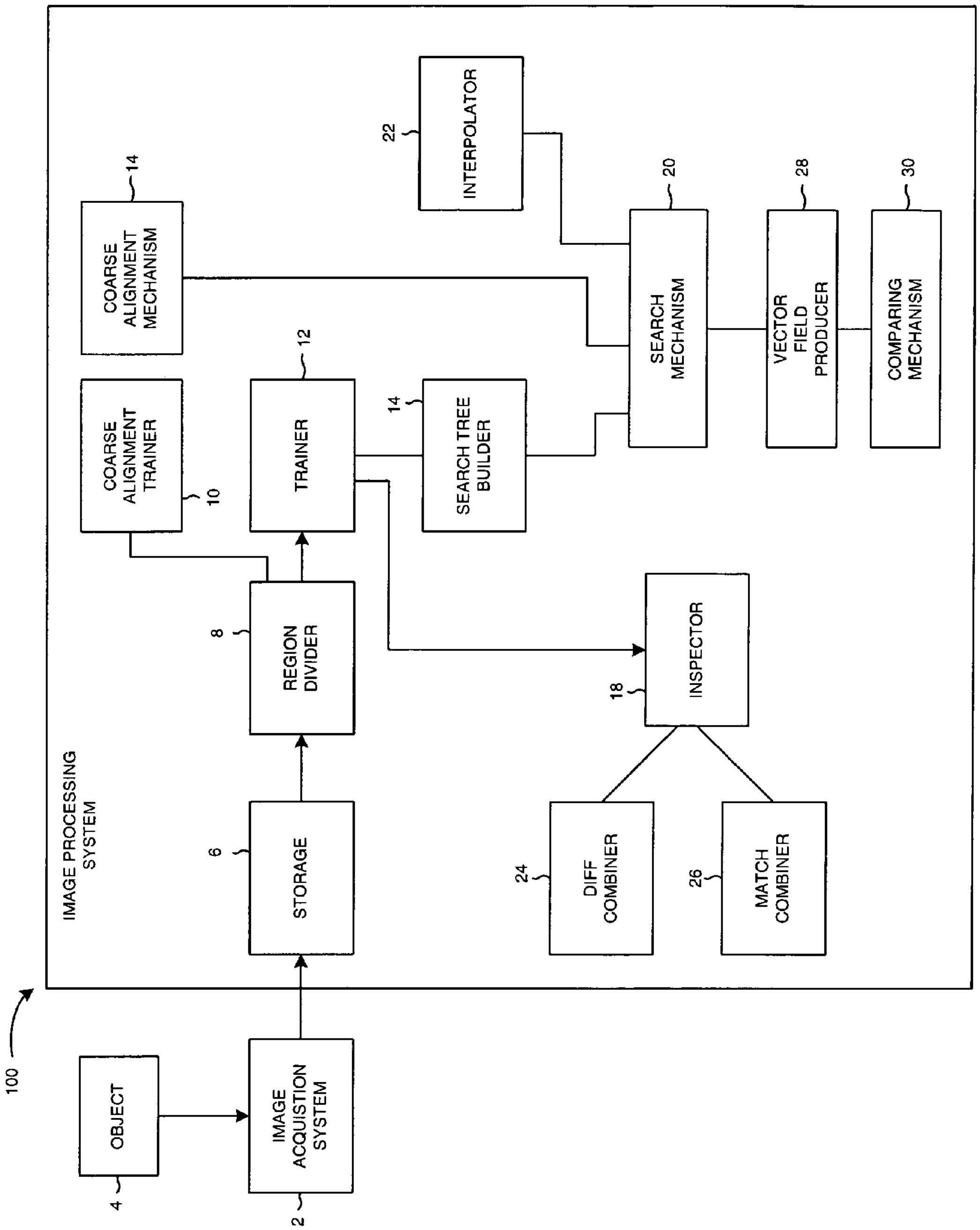
FIG. 1 is a diagram which shows components of a machine vision system.

FIG. 1 is a diagram of an embodiment of the invention. Image acquisition system 2 obtains a digital image of an object 4. The image is received by image processing system 100.

Image processing system 100 includes storage 6 for receiving and storing the digital image. The storage 6 could be, for example, a computer memory.

Region divider 8 divides a region of interest, included in the image, into an array of smaller sub-regions, such that each of the sub-regions is of a size which can be inspected reliably using an inspecting method.

A coarse alignment trainer 10 and a trainer 12 train respective models for each of the sub-regions. The coarse alignment trainer 10 trains the model for a coarse alignment mechanism 14 and the trainer trains respective models for each of the sub-regions for a search mechanism 20 and for an inspector 18.

A search tree builder 14 builds a search tree using results from training the search mechanism 20. A coarse alignment mechanism 14 approximately locates and establishes a root sub-region which is then used by the search tree builder 14 as a starting point for building the search tree.

The search mechanism 20 searches for each of the sub-regions using results from the coarse alignment mechanism 14 in order to determine where to begin the search and information from the search tree produced by the search tree builder 14 to determine which of the sub-regions for which to search next. The search tree builder 14 establishes the search tree such that an order of transformation information for located ones of the sub-regions is used to minimize a search range for neighboring ones of the sub-regions.

A search mechanism 20 searches for the sub-regions. The information from the search tree is used to determine an order of sub-regions for which to search. The search mechanism may be, for example, PatMax, which is a search tool available from Cognex Corporation of Natick, Mass. The search tool may also be, for example, a correlation search, as well as other search tools which may be known or commercially available.

When a sub-region is not properly trained, for example, due to a lack of features, an interpolator 22 uses transformation information from located neighboring ones of the sub-regions to predict registration results, or location information, for the untrained sub-region.

An inspector 18 inspects each of the sub-regions and produces a difference image and a match image for each of the sub-regions. A difference image combiner 24 combines the difference images from all of the sub-regions into a single difference image, and a match image combiner 26 combines the match images from all of the sub-regions into a single match image.

A vector field producer 28 compares a pattern in a sub-region at run time with a trained model pattern in a corresponding sub-region, and produces a vector field for the sub-region. The vector field indicates a magnitude and a direction of a distortion of the pattern at run time, as compared with the model pattern.

A comparing mechanism 30 compares the vector field for each sub-region against user defined tolerances, and based on results of the comparison makes a pass/fail decision.

Figure 2:
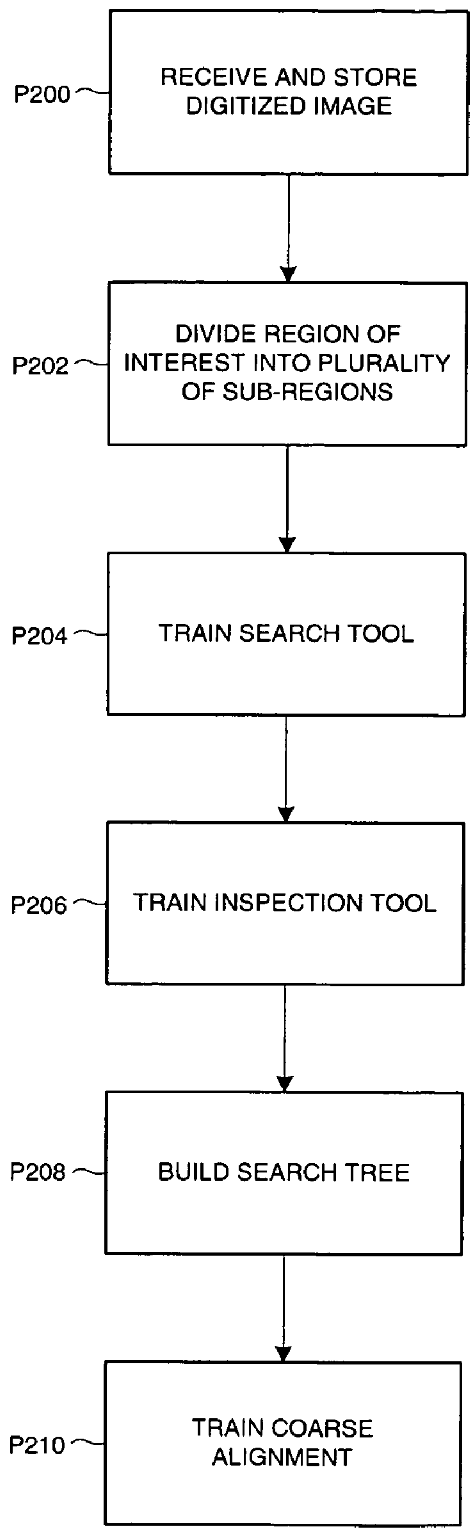
FIG. 2 is a flowchart for explaining training of the system to recognize patterns.

FIG. 2 is a flowchart of a process for training a system to inspect spatially distorted patterns. At P200 digitized image data of an object is received and stored. The data could be stored in, for example, a computer memory.

Figure 3:
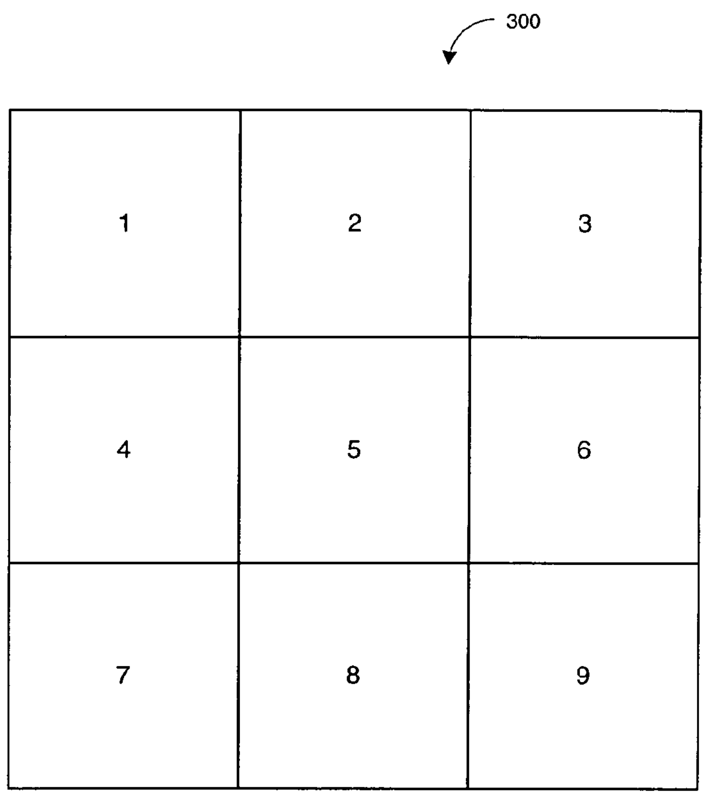
FIG. 3 provides an example of a region of interest comprising a plurality of regions.

At P202 a region of interest within the digitized image is divided into a plurality of sub-regions. FIG. 3, for example, shows region of interest 300 being divided into 9 sub-regions(1–9) in a form of a 3×3 array. However, the region of interest could be divided into any number of sub-regions.

At P204, respective models for each of the sub-regions are trained for a search tool. The search tool could be, for example, PatMax, which is available from Cognex Corporation of Natick, Mass. However, other search tools or methods can be used; for example, a correlation search method may be used. Note that if a sub-region cannot be located by the search tool due to, for example, spatial distortion, the sub-region can be further sub-divided into smaller sub-regions in an effort to find a sub-region size which could be located by the search tool. However, if, for example, due to a lack of features, a sub-region cannot be located, location information can be predicted from transformation information from neighboring sub-regions. In other words, transformation information, for example, scale, rotation and skew, from located sub-regions can be used to interpolate transformation information for a sub-region when the sub-region cannot be located.

At P206, respective models for each of the sub-regions are trained for an inspection tool. The inspection tool could be, for example, PatInspect, which is available from Cognex Corporation of Natick, Mass. Other search tools or methods can also be used; for example, a tool using a golden-template-comparison method may be used.

At P208, a search tree is built based upon the training information from training the search tool (P204). With reference to FIG. 3, the search tree may indicate, for example, to search the sub-regions in the following order: 5, 4, 1, 7, 2, 8, 6, 3 and 9. However, the sub-regions may be searched in other orders which may work equally well, for example, 5, 6, 3, 9, 2, 8, 4, 1 and 7. By searching in an order using contiguous sub-region information from found ones of the contiguous sub-regions, a search range is minimized, e.g., position, orientation, and scale, for the neighboring regions.

At P210, a coarse alignment tool is trained. If distortion of the pattern is small, the whole pattern may be used for training. Otherwise a smaller region of interest may be used, based upon, for example, user input describing expected distortion and an algorithm for performing the coarse alignment.

Figure 4:
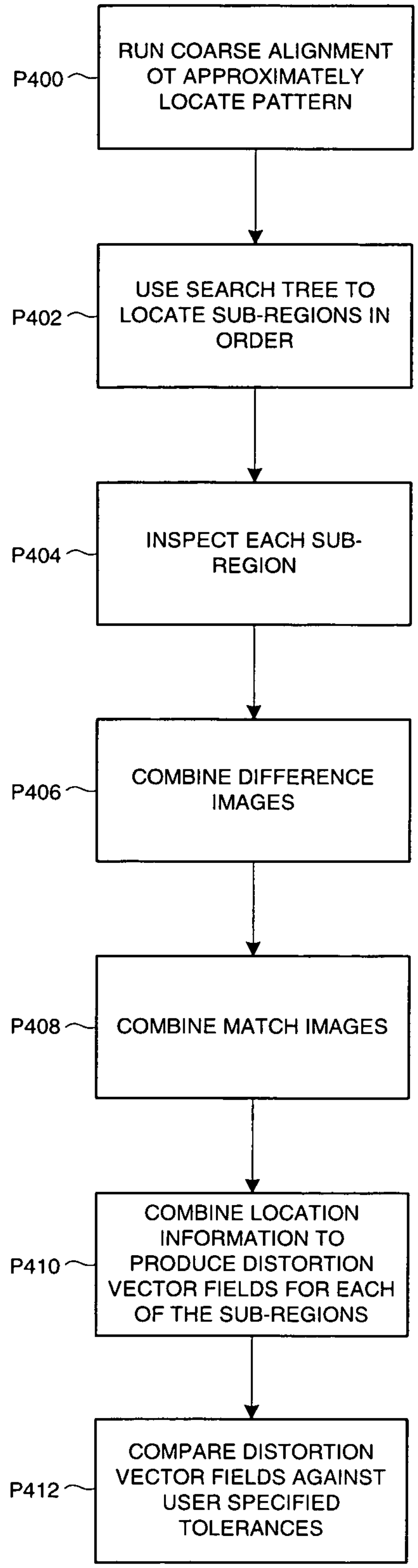
FIG. 4 is a flowchart for explaining the processing occurring at run time in an embodiment of the invention.

FIG. 4 is a flowchart explaining the processing which takes place during run time. At P400, the coarse alignment tool is run to approximately locate the pattern and thereby approximately locate the root sub-region. In our example, shown in FIG. 3, sub-region 5 is the root sub-region because of its central location.

At P402, the search tree information is used to provide an order of searching, while applying a search tool to locate the sub-regions. The coarse alignment tool provides an approximate location for a root sub-region. The search tool may be PatMax, as described previously, or any other search tool, such as one that uses a correlation search.

When a sub-region cannot be properly located, for example, due to a lack of features, an interpolator 22 uses transformation information from located neighboring ones of the sub-regions to predict registration results, or location information.

At P404 an inspection tool is executed to inspect each of the sub-regions. The inspection tool produces a match image and a difference image for each of the sub-regions.

Figure 5A:
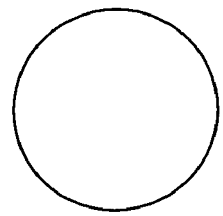
FIGS. 5A–5D provide examples of a model pattern, an inspected pattern, a difference image and a match image, respectively.
Figure 5B:
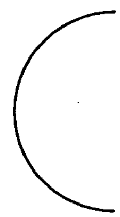
Figure 5C:
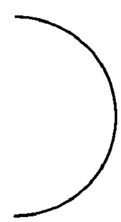
Figure 5D:
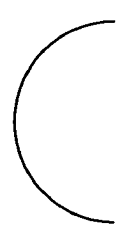

FIGS. 5A–5D help to explain match and difference images. FIG. 5A shows a training model of a circle. FIG. 5B shows a pattern to be inspected in a sub-region. The pattern is a half-circle on the left side of the image. FIG. 5C illustrates a difference image for the sub-region. As can be seen from FIG. 5C, the image shows that a half-circle on the right side of the image is needed to supplement FIG. 5B in order to transform the image from the inspected pattern to the training model. FIG. 5D is a match image illustrating that the inspected pattern of FIG. 5B matches the training model in a half-circular portion on the left side of the image.

At P406 and P408, the difference images for the sub-regions and the match images for the sub-regions are combined into single difference and match images for the region of interest, respectively.

At P410, the location information obtained by the search tool is used to produce a distortion vector field.

Figure 6A:
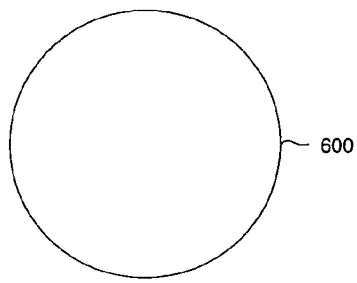
FIGS. 6A–6C provide examples of a training model, a nonlinearly spatially distorted pattern and distortion vector fields, respectively.
Figure 6B:
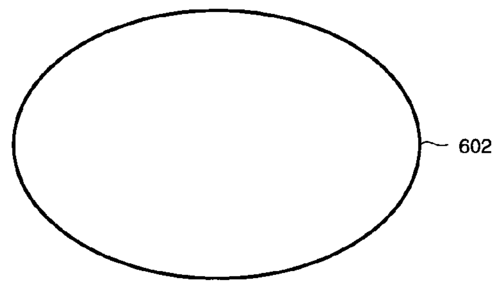
Figure 6C:
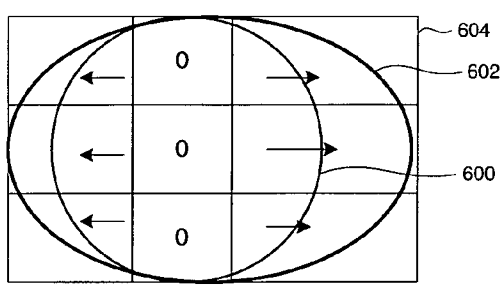

FIGS. 6A–6C help to illustrate a distortion vector field. FIG. 6A shows a training model, in this example, a circle 600. FIG. 6B shows a distorted pattern being inspected, in this case an ellipse 602. FIG. 6C shows the training model 600 being overlayed by the distorted pattern 602. A region of interest 604 surrounds both patterns. The region of interest is subdivided into a plurality of sub-regions, in this example, a 3×3 array of sub-regions. As can be observed in FIG. 6C by comparing the model 600 with the distorted pattern 602, no distortion occurs in the central three subregions; however, the distortion vector field indicates that the three leftmost sub-regions are distorted to the left and the three rightmost sub-regions are distorted to the right. The magnitude of the distortion vector representing each sub-region is the distance between the training model 600 and the distorted pattern 602 within the sub-region.

At P412, the distortion vector fields are compared against user-specified tolerances, and based on results of the comparison, a pass/fail decision is made.

In addition, the combined match or difference images could be used to locate defects. For example, if there are no defects, the difference image will be black.

The invention may be implemented by hardware or a combination of hardware and software. The software may be recorded on a medium for reading into a computer memory and executing. The medium may be, but is not limited to, for example, one or more of a floppy disk, a CD ROM, a writable CD, a Read-Only-Memory (ROM), and an Electrically Alterable Programmable Read Only Memory (EAPROM).

While the invention has been described by way of example embodiments, it is understood that the words which have been used herein are words of description, rather than words of limitation. Changes may be made, within the purview of the appended claims, without departing from the scope and spirit of the invention in its broader aspects. Although the invention has been described herein with reference to particular means, materials, and embodiments, it is understood that the invention is not limited to the particulars disclosed. The invention extends to all equivalent structures, means, and uses which are within the scope of the appended claims.

We claim as our invention:

1. A method for training a system to inspect a spatially distorted pattern, the method comprising:

receiving a digitized image of an object, the digitized image including a region of interest;

dividing the region of interest in its entirety into a plurality of non-overlapping sub-regions, a size of each of the non-overlapping sub-regions being small enough such that an image-feature-position-based inspecting tool can reliably inspect each of the sub-regions;

training only a fine search tool and an image-feature-position-based inspection tool for a respective single model for each of the plurality of non-overlapping sub-regions;

building a single search tree for determining an order for inspecting each non-overlapping sub-region of the plurality of non-overlapping sub-regions at a run-time; and training a coarse alignment tool for the region of interest in its entirety so as to enable providing at run time an approximate location for a root sub-region of the single search tree.

2. The method according to claim 1, wherein the size of each of the non-overlapping sub-regions is small enough such that each of the sub-regions is well-approximated by an affine transformation.

3. The method of claim 1, wherein the building of the single search tree comprises:

establishing the order so that location information for located ones of the non-overlapping sub-regions is used to minimize a search range for neighboring ones of the non-overlapping sub-regions.

4. The method of claim 1, wherein the training of only the fine search tool for the respective single model for each of the plurality of non-overlapping sub-regions is performed by using a correlation search.

5. The method of claim 1, wherein the training of the image-feature-position-based inspection tool for the respective single model for each of the plurality of non-overlapping sub-regions is performed by using a golden template comparison method.

6. A method for inspecting a spatially distorted pattern, the method comprising:

running a coarse alignment tool to approximately locate the spatially distorted pattern in its entirety within a region of interest so as to provide an approximate location for a root sub-region of a single search tree;

running only a fine alignment tool in an order according to the single search tree, and using the approximate location of the root sub-region to locate a plurality of non-overlapping sub-regions within the region of interest so as to provide fine location information, the non-overlapping sub-regions covering the region of interest in its entirety, each of the non-overlapping sub-regions being of a size small enough such that an image-feature-position-based inspecting method can reliably inspect each of the non-overlapping sub-regions using respective single models;

inspecting each of the non-overlapping sub-regions using the fine location information and the image-feature-position-based inspecting method so as to produce a difference image for each of the non-overlapping sub-regions.

7. The method of claim 6, further comprising:

comparing the fine location information with model location information so as to provide a distortion vector for each non-overlapping sub-region;

combining all distortion vectors, one for each non-overlapping sub-region, so as to produce a distortion vector field; and using the distortion vector field to make a pass/fail decision based on user-specified tolerances.

8. The method of claim 7, wherein:

the inspecting using the fine location information and the image-feature-position-based inspecting method produces a difference image for each of the non-overlapping sub-regions and a match image for each of the non-overlapping sub-regions, the method further comprising:

combining the difference images for each of the non-overlapping sub-regions into a single difference image;

combining the match images for each of the non-overlapping sub-regions into a single match image;

comparing the fine location information with model location information so as to provide a distortion vector for each non-overlapping sub-region; and combining all distortion vectors, one for each non-overlapping sub-region, so as to produce a distortion vector field.

9. The method of claim 6, wherein:

the inspecting using the fine location information and the image-feature-position-based inspecting method produces a match image for each of the non-overlapping sub-regions, the method further comprising:

combining the difference images for each of the non-overlapping sub-regions into a single difference image; and combining the match images for each of the non-overlapping sub-regions into a single match image.

10. The method according to claim 6, wherein the size of each of the non-overlapping sub-regions is small enough such that each of the non-overlapping sub-regions is well approximated by an affine transformation.

11. The method of claim 6, further comprising:
using the fine location information from located ones of the non-overlapping sub-regions to interpolate location information for a non-overlapping sub-region when the non-overlapping sub-region cannot be located; and
inspecting the non-overlapping sub-region based on the interpolated location information.

12. The method of claim 6, further comprising:
using respective single models for at least some of the non-overlapping sub-regions to determine respective fine location information; and
predicting fine location information in at least one of the non-overlapping sub-regions by using the respective fine location information of neighboring ones of the at least some of the non-overlapping sub-regions when the at least one of the non-overlapping sub-regions cannot be located by running the fine alignment tool.

13. The method of claim 6, wherein the inspecting of each of the non-overlapping sub-regions using an image-feature-position-based inspecting method is performed by a golden-template comparison method.

14. The method of claim 6, further comprising:
dividing one of the non-overlapping sub-regions into a plurality of smaller non-overlapping sub-regions when the one of the non-overlapping sub-regions cannot be located using a fine search tool.

15. An apparatus for inspecting a spatially distorted pattern, the apparatus comprising:
a memory for storing a digitized image of an object;
a region divider for dividing the digitized image of a region of interest in its entirety into a plurality of non-overlapping sub-regions, the non-overlapping sub-regions covering the region of interest completely, a size of each of the non-overlapping sub-regions being small enough such that an image-feature-position-based inspecting method can reliably inspect each of the non-overlapping sub-regions;
a coarse alignment tool for approximately locating the pattern so as to provide an approximate location for a root sub-region of a single search tree;
a fine search tool only for locating each of the non-overlapping sub-regions sequentially in an order based on the single search tree; and
an image-feature-position-based inspector for inspecting each of the non-overlapping sub-regions.

16. The apparatus of claim 15, further comprising:
a vector field producer to combine all location information to produce a distortion vector field for each of the non-overlapping sub-regions; and
a comparing mechanism for using the distortion vector field to make a pass/fail decision based on user specified tolerances.

17. The apparatus of claim 15, wherein:
the image-feature-position-based inspector for inspecting each of the non-overlapping sub-regions produces a difference image for each of the non-overlapping sub-regions and a match image for each of the non-overlapping sub-regions, the apparatus further comprises:
a first combiner for combining the difference images for each of the non-overlapping sub-regions into a single difference image; and
a second combiner for combining the match images for each of the non-overlapping sub-regions into a single match image.

18. The apparatus according to claim 15, wherein the size of each of the non-overlapping sub-regions is small enough such that each of the non-overlapping sub-regions is well-approximated by an affine transformation.

19. The apparatus of claim 15, further comprising:
an interpolator for using location information from located ones of the non-overlapping sub-regions to interpolate location information for a non-overlapping sub-region when the non-overlapping sub-region cannot be located by the fine search tool; wherein
the image-based inspector inspects the non-overlapping sub-region based on the interpolated location information.

20. The apparatus of claim 15, further comprising:
an interpolator for using the respective models for at least some of the non-overlapping sub-regions to determine respective location information, and for predicting location information in at least one of the non-overlapping sub-regions by using the respective location information of neighboring ones of the at least some of the non-overlapping sub-regions when the at least one of the non-overlapping sub-regions cannot be located.

21. The apparatus of claim 15, wherein the image-feature-position-based inspector inspects each of the non-overlapping sub-regions by using a golden-template comparison method.

22. An apparatus for inspecting a spatially distorted pattern, the apparatus comprising:
a storage for storing a digitized image of an object, the digitized image including a region of interest;
a region divider for dividing the region of interest in its entirety into a plurality of non-overlapping sub-regions, a size of each of the non-overlapping sub-regions being small enough such that an image-feature-position-based inspecting method can reliably inspect each of the non-overlapping sub-regions;
a trainer for training a respective single model for a fine search tool only and for an image-feature-position-based inspector for each of the plurality of non-overlapping sub-regions;
a search tree builder for building a single search tree for determining an order for image-feature-position-based inspecting of each sub-region of the plurality of non-overlapping sub-regions at a run time;
a coarse alignment trainer;
a coarse alignment tool for approximately locating the pattern so as to provide an approximate location for a root sub-region of a single search tree, the coarse alignment tool being configured to be trained by the coarse alignment trainer;
a fine search tool only for locating each of the non-overlapping sub-regions sequentially in an order based on the single search tree, the root sub-region of the single search tree being provided by the coarse alignment tool; and
an image-based inspector for inspecting each of the non-overlapping sub-regions.

23. The apparatus according to claim 22, further comprising:
a vector field producer to combine all location information to produce a distortion vector field for each of the non-overlapping sub-regions; and
a comparing mechanism for using the distortion vector fields to make a pass/fail decision based on user specified tolerances.

24. The apparatus of claim 22, wherein:
the image-feature-position-based inspector produces a difference image for each of the non-overlapping subregions and a match image for each of the non-overlapping sub-regions, the apparatus further comprises:

a first combiner for combining the differences images for each of the non-overlapping sub-regions into a single difference image; and a second combiner for combining the match images for each of the non-overlapping sub-regions into a single match image.

25. The apparatus according to claim 22, wherein the size of each of the non-overlapping sub-regions is small enough such that each of the non-overlapping sub-regions is well approximated by an affine transformation.

26. The apparatus of claim 22, wherein the building of the single search tree comprises:

establishing the order so that location information for located ones of the non-overlapping sub-regions is used to minimize a search range for neighboring ones of the non-overlapping sub-regions.

27. The apparatus of claim 22, further comprising:

an interpolator for using location information from located ones of the non-overlapping sub-regions to interpolate location information for a non-overlapping sub-region when the sub-region cannot be located, wherein the image-feature-position-based inspector inspects the previously unlocated non-overlapping sub-region based on the interpolated location information.

28. A medium having a stored therein machine-readable information, such that when the machine-readable information is read into a memory of a computer and executed, the machine-readable information causes the computer:

to receive a digitized image of an object, the digitized image including a region of interest;

to divide the region of interest in its entirety into a plurality of non-overlapping subregions, a size of each of the non-overlapping sub-regions being small enough such that an image-feature-position-based inspecting method can reliably inspect each of the non-overlapping sub-regions;

to train a respective single model for a fine search tool only and for an image-feature-position-based inspection tool for each of the plurality of non-overlapping sub-regions;

to build a single search tree for determining an order for inspecting the plurality of non-overlapping sub-regions at a run-time; and to train a respective model for a coarse alignment tool so as to enable providing at run time an approximate location for a root sub-region of the single search tree.

29. The medium of claim 28, wherein when building the single search tree, the machine-readable information causes the computer:

to establish the order so that location information for located ones of the non-overlapping sub-regions is used to minimize a search range for neighboring ones of the non-overlapping sub-regions.

30. The medium of claim 28, wherein the machine-readable information further causes the computer:

to run a coarse alignment tool to approximately locate a pattern so as to provide an approximate location for a root sub-region of a single search tree;

to run only a fine alignment tool in an order according to the single search tree and using the approximate location of the root sub-region approximately located by the coarse alignment tool to locate a plurality of non-overlapping sub-regions so as to provide fine location information, each of the non-overlapping sub-regions being of a size small enough such that an image-feature-position-based inspecting method can reliably inspect each of the non-overlapping sub-regions; and to perform image-based inspection of each of the non-overlapping sub-regions to produce a difference image for each of the non-overlapping sub-regions and a match image for each of the non-overlapping sub-regions.

31. The medium of claim 30, wherein the machine-readable information further causes the computer:

to combine the difference images for each of the non-overlapping sub-regions into a single difference image; and to combine the match images for each of the non-overlapping sub-regions into a single match image.

32. The medium of claim 30, wherein the machine-readable information further causes the computer:

to compare the fine location information with model location information so as to provide a distortion vector for each non-overlapping sub-region;

to combine all distortion vectors, one for each non-overlapping sub-region, so as to produce a distortion vector field; and to use the distortion vector field to make a pass/fail decision based on user-specified tolerances.

33. The medium of claim 28, wherein the machine-readable information further causes the computer:

to use fine location information from located ones of the non-overlapping sub-regions to interpolate fine location information for a non-overlapping sub-region when the non-overlapping sub-region cannot be located; and to run an image-feature-position-based inspection tool on the non-overlapping sub-region based on the interpolated fine location information.

34. A method for inspecting a spatially distorted pattern, the method comprising:

running a coarse alignment tool to approximately locate the pattern so as to provide an approximate location for a root sub-region of a single search tree;

running only a fine alignment tool in an order according to the single search tree, and using the approximate location of the root sub-region, to locate a plurality of non-overlapping sub-regions so as to provide fine location information, each of the non-overlapping sub-regions being of a size small enough such that an image-feature-position-based inspecting method can reliably inspect each of the non-overlapping sub-regions;

comparing the fine location information with model location information so as to provide a distortion vector for each non-overlapping sub-region;

combining all distortion vectors, one for each non-overlapping sub-region, so as to produce a distortion vector field; and using the distortion vector field to make a pass/fail decision based on user-specified tolerances.

35. An apparatus for inspecting a spatially distorted pattern, the apparatus comprising:

a memory for storing a digitized image of an object;

a region divider for dividing the digitized image of a region of interest in its entirety into a plurality of non-overlapping sub-regions, a size of each of the non-overlapping sub-regions being small enough such that an image-feature-position-based inspecting method can reliably inspect each of the non-overlapping sub-regions;

a coarse alignment tool for approximately locating the pattern so as to provide an approximate location for a root sub-region of a single search tree;

a fine search tool only for locating each of the non-overlapping sub-regions sequentially in an order based on the single search tree so as to provide fine location information;

a vector field producer for comparing the fine location information with model location information so as to provide a distortion vector for each non-overlapping sub-region, and for combining the distortion vectors to produce a distortion vector field; and a comparing mechanism for using the distortion vector field to make a pass/fail decision based on user specified tolerances.

36. A medium having stored therein machine-readable information, such that when the machine-readable information is read into a memory of a computer and executed, the machine-readable information causes the computer:

to run a coarse alignment tool to approximately locate a pattern so as to provide an approximate location for a root sub-region of a single search tree;

to run only a fine alignment tool in an order according to the single search tree using the root sub-region approximately located by the coarse alignment to locate a plurality of non-overlapping sub-regions so as to provide fine location information, each of the non-overlapping sub-regions being of a size small enough such that an image-feature-position-based inspecting method can reliably inspect each of the non-overlapping sub-regions;

to compare the fine location information with model location information so as to provide a distortion vector for each non-overlapping subregion;

to combine all distortion vectors, one for each non-overlapping sub-region, so as to produce a distortion vector field; and to use the distortion vector field to make a pass/fail decision based on user-specified tolerances.

* * * * *